Patented Nov. 24, 1925.

1,562,490

UNITED STATES PATENT OFFICE.

HARRY P. BASSETT, OF CYNTHIANA, KENTUCKY.

METHOD OF MAKING ARSENATES.

No Drawing.    Application filed February 19, 1923. Serial No. 620,050.

*To all whom it may concern:*

Be it known that I, HARRY P. BASSETT, a citizen of the United States, residing at Cynthiana, in the county of Harrison and State of Kentucky, have invented certain new and useful Improvements in Methods of Making Arsenates, of which the following is a specification.

This invention relates to methods of oxidizing arsenious oxid, arsenious acid, and its compounds, and more particularly to methods of oxidizing these materials in which chlorine is employed.

All of the arsenate in commerce today is produced by the oxidation of arsenious acid with concentrated nitric acid, the material produced being then neutralized with the desired base. A serious objection to this method is that nitric acid is not complete in its oxidizing power and is not even in its action. This often causes explosions, due to sudden reactions taking place. Nitric acid does not act completely on arsenious oxid unless the oxid is of 99 per cent purity or better.

This causes a limit on the amount of arsenic available and the arsenious compounds cannot be employed as a substitute therefor. The compounds of arsenious oxid, such as sodium and calcium arsenites, are not available for the production of arsenates when the nitric acid method is used.

Heretofore, it has been impossible to successfully and commercially produce arsenates by means of chlorine.

In the present invention, I provide a method by means of which arsenious compounds including the arsenites may be oxidized by means of chlorine. Arsenious acid, or one of its compounds, is treated with either a compound of a base capable of forming a soluble chlorid and an insoluble arsenate, such as lime, and then treated with chlorine, or is treated with bleaching powder. When the lime and chlorine are separately added, the arsenious acid and lime first form mono-calcium arsenite with possibly some di-calcium arsenite. When the chlorine is added to this material, calcium chlorid and mono-calcium arsenate with possibly some di-calcium arsenate, are formed. When bleaching powder is employed, these reactions take place substantially simultaneously. A solution of white arsenic is first prepared and bleaching powder added thereto in the theoretical amount, the reaction being permitted to take place in a closed vessel, giving the arsenious oxid time to react with the calcium chlorid present to form a mixture of mono-calcium arsenate and di-calcium arsenate. The mixture of arsenates is treated with enough lime to combine with the arsenic but not sufficient to form basic calcium chlorid, forming a mixture of di-calcium arsenate and tri-calcium arsenate which is insoluble. If too much lime is added at this point, insoluble basic calcium chlorid will be formed which cannot be readily separated from the di-calcium arsenate and tri-calcium arsenate. The amount of lime to be added at this point may be determined by testing the solution for basicity or alkalinity. As soon as tri-calcium arsenate begins to form, the boiling solution will turn phenol phthalein red.

In a typical embodiment of the invention, a suspension of white arsenic or one of its compounds is first prepared and bleaching powder added thereto in the theoretical amount to furnish sufficient chlorine to oxidize the $As_2O_3$ to $As_2O_5$. The mixture is placed in a closed vessel where any chlorine that is liberated is prevented from escaping, giving the arsenious oxide time to react with the calcium chlorid present. The result of the reaction is a mixture of mono-calcium arsenate and di-calcium arsenate, along with the formation of calcium chlorid which acts as a catalyzer during the reaction.

If gaseous chlorine is used, enough lime must be added to the arsenious compound to form mono-calcium arsenite with possibly some di-calcium arsenite before the chlorine is added. This material is placed in a closed tank and the chlorine added thereto forming mono-calcium arsenate, di-calcium arsenate, and calcium chlorid. The mixture is then placed in an agitating tank and enough lime added to set the arsenic. By "setting" is meant to convert the mixture of mono-calcium arsenite and di-calcium arsenite to di-calcium arsenate and tri-calcium arsenate which are insoluble. As above stated, it is necessary to carefully gauge the amount of lime added to prevent the formation of insoluble basic calcium chlorid which cannot be readily separated from the insoluble arsenates.

During this part of the process, it is advisable to heat the solution to a temperature of substantially 60° C., and promote the reaction. The slurry formed is then fed to a filter and the mixture of arsenates filtered off and washed to remove the calcium chlorid. Sufficient milk of lime may then be added to bring the $As_2O_5$ down to 40 per cent. The reason for adding the lime in two portions is as follows: If too great a quantity of lime is added at the beginning, the calcium chlorid reacts with it to form oxychlorid which is only slightly soluble in cold or lukewarm water. It is impossible to wash the arsenate with hot water, as this would hydrolize it and form soluble arsenate. It is, therefore, advantageous to form di-calcium arsenate and tri-calcium arsenate, wash free of chlorids and then add the excess of lime as required by the Government specifications. In this manner, a mixture of arsenates entirely free of chlorids is obtained without losing any arsenic.

While I have described in detail the preferred practice of my process, it is to be understood that the details of procedure may be widely varied without departing from the spirit of the invention or the scope of the subjoined claims.

Having thus described my invention, I claim:

1. The method of oxidizing arsenious compounds to form arsenates which comprises treating such compounds with sufficient quantity of a base capable of forming a soluble chlorid and insoluble arsenates to form arsenites of such base, adding chlorine thereto to form arsenates of said base and a chlorid of said base, maintaining the acidity of the solution during oxidation, and adding thereafter an additional quantity of such base until the solution becomes slightly alkaline to form insoluble arsenates of said base and a soluble chlorid of said base.

2. The method of oxidizing arsenious compounds to form arsenates which comprises treating such compounds with a sufficient quantity of a calcium compound to form calcium arsenites, adding chlorine thereto to form calcium arsenates, maintaining the acidity of the solution during oxidation, and adding thereafter an additional quantity of a calcium compound until the solution becomes slightly alkaline forming a soluble calcium chlorid and insoluble calcium arsenates.

3. The method described in claim 2 characterized by the fact that the calcium chlorid is separated from the calcium arsenates by filtration.

4. The method described in claim 2 wherein additional calcium compound is added to the calcium arsenates after separating the said arsenates from the calcium chlorid present.

5. The method of oxidizing arsenious compounds to form arsenates which comprises treating such compounds with a sufficient quantity of a calcium compound to form mono-calcium arsenite and di-calcium arsenite, adding chlorine thereto to form mono-calcium arsenate, di-calcium arsenate and calcium chlorid, maintaining the acidity of the solution during oxidation, and adding thereafter an additional quantity of such calcium compound until the solution becomes slightly alkaline to form a mixture of insoluble di-calcium arsenate, insoluble tri-calcium arsenate, and soluble calcium chlorid.

6. The process described in claim 5 wherein additional calcium compound is added to the di-calcium arsenate and tri-calcium arsenate after they have been separated from the soluble calcium chlorid.

In testimony whereof, I affix my signature.

HARRY P. BASSETT.